United States Patent [19]
Usui et al.

[11] Patent Number: 5,492,376
[45] Date of Patent: Feb. 20, 1996

[54] CONNECTING AND FIXING METHOD FOR METALLIC PIPES WITH SMALL DIAMETER

[75] Inventors: Masayoshi Usui; Katsushi Umezawa, both of Numazu, Japan

[73] Assignee: Usui Kokusai Sangyo Kaisha Ltd., Japan

[21] Appl. No.: 276,555

[22] Filed: Jul. 18, 1994

[30] Foreign Application Priority Data

Aug. 20, 1993 [JP] Japan .................. 5-200378

[51] Int. Cl.⁶ .................................. F16L 13/16
[52] U.S. Cl. .................. 285/382; 285/915; 29/508
[58] Field of Search .................. 285/382, 915, 285/382.1, 374; 29/508

[56] References Cited

U.S. PATENT DOCUMENTS

| | | | |
|---|---|---|---|
| 309,247 | 12/1884 | Patterson | 285/382 |
| 2,862,732 | 12/1958 | Guillou | 285/382 |
| 3,134,611 | 5/1964 | Iversen | 29/508 |
| 3,378,282 | 4/1968 | Demler, Sr. | 285/382 |
| 3,441,293 | 4/1969 | Bagnulo | 285/382 |
| 3,686,747 | 8/1972 | Bagnulo | 285/382 |
| 4,330,924 | 5/1982 | Kushner et al. | 29/508 |
| 4,598,938 | 7/1986 | Boss et al. | 29/508 |
| 5,016,925 | 5/1991 | Davis | 285/382 |
| 5,310,224 | 5/1994 | Tenglund | 29/508 |

FOREIGN PATENT DOCUMENTS

| | | | |
|---|---|---|---|
| 1203066 | 10/1965 | Germany | 285/382 |
| 13587 | 4/1972 | Japan | 285/382 |
| 4165189 | 6/1992 | Japan | 285/382 |
| 511527 | 8/1939 | United Kingdom | 285/382 |

Primary Examiner—Eric K. Nicholson
Attorney, Agent, or Firm—Anthony J. Casella; Gerald E. Hespos

[57] ABSTRACT

A connecting and fitting method is provided for metallic pipes with a small diameter. The method includes providing a piping component having a tube wall extending therefrom and defining an expanded chamber. The method further includes providing a pipe member and forming at least one circumferential discontinuity in the pipe member near one end. The end of the pipe member is then inserted through an annular sealing component and into the expanded chamber defined by the tube wall. A diameter reducing area is then formed on the tube wall at a location substantially registered with the circumferential discontinuity in the pipe member to squeeze and tightly seal the sealing component into connecting engagement with the circumferential discontinuity on the pipe member.

7 Claims, 5 Drawing Sheets

CONNECTING AND FIXING METHOD FOR METALLIC PIPES WITH SMALL DIAMETER

BACKGROUND OF THE INVENTION:

1. Field of the Invention

This invention is directed to a method for connecting and fixing metallic pipes with small outer diameter to various types of connecting fittings and base plates (hereafter they will be merely referred to as "piping components"); wherein said metallic pipes have relatively small diameter which is less than 20 mm. These metallic pipes are generally utilized as a supplying means for oil and/or air in automobiles, or various machines and equipments.

2. Description of the Prior Art

By a conventional type of connecting and fixing method of metallic pipes, a connecting portion of the pipe member is inserted into connecting hole portions on the counter member side which is composed of the piping components, and the connecting portions will be connected to each other by employment of a soldering technique involving the heating of the metallic soldering materials by a burner heat.

By the above conventional method, however, when the outer peripheral surface of the pipe member is plated by zinc or the like or coated with resins or the like as an aim of the anti-corrosion film treatment or the piping components are treated as described above for the same purposes, said protection films will be subjected to a severely deterioration or varnishing at a vicinity of the solder joint portions as a result of the heating generated during soldering procedures. Accordingly, said portions are needed to be furtherly subjected to a film coating treatment once again after the heating soldering, and this treatment usually leads to various technical drawbacks. These technical drawbacks might include (1) the expected performance of the coating treatment of the protective film will be reduced and procedures will become more complicated, and (2) the thickness of the protective film that had been reapplied can not be uniform. In addition the mentioned technical drawbacks might furtherly include (3) unskill operator of the soldering practice might cause a local over-heating of the soldering materials, causing an unnecessary deterioration of the mechanical strength in a vicinity area of the soldered components, and also (4) the soldered components accordingly might be subjected to failure by cracking or fracture due to the vibrational movement which will be generated during the regular piping procedures.

OBJECTS AND SUMMARY OF THE INVENTION:

In order to overcome the aforementioned technical drawbacks associated with said conventional methods, it is, therefore, an object of this invention to provide a connecting and fixing method for metallic pipes with relatively small diameter, by which the heating soldering means is completely avoided, pipe members or piping components on which the aforementioned film was previously coated can be used, and the re-treatment process of the film coating after the connecting practice is not necessitated, so that the operational procedure becomes as a consequence simpler and the producability can be enhanced significantly. Moreover, the mechanical strength at the jointed portions is not reduced and expected failures at the soldered components by cracking or fracture will not likely take place under the vibrational movement during the piping procedures. Hence the connected portion will be securely fixed and mechanically stable for a long period of time.

At the aim of achieving of the above object of the present invention, the pipe members are designed to be inserted into the expanded portion of the piping components in which the diameter expanding chamber is provided by a tube wall on the connecting side along a passage hole that is located inside the axial core portion. Said pipe members are inserted into the expanded portion through a cylindrical sealing member made of either elastic materials that include rubber or resins, or soft metallic materials, or lining or cladding materials of the above.

To obtain the desired effect of this invention, the above sealing member is furtherly squeezed and tightened by means of the diameter reducing forming method applied on the outer periphery of the tube wall portion forming said diameter expanding chamber, while the pipe members will be connected. The aforementioned diameter reducing forming can be achieved by a number of ways that include the following: (1) squeezing the whole portion of the tube wall, which forms the pipe expanding chamber, along its longitudinal-direction or by partially squeezing the tube wall by forming a plurality of circular concave grooves, (2) initially providing inwardly circular projections on the tube wall, an expanding wall on the pipe member or concave grooves on at least the pipe member and/or the tube wall and subsequently deforming the tube wall inwardly, (3) providing previously an outwardly projection on the tube wall of the piping components, so that inward projections can be formed by urging the diameter reducing forming inwardly to define a smooth cylindrical external surface which will provide a secure connection, (4) providing the stepwise-shaped diameter expanding portion in a position that is at the connecting end portion of the pipe member and the bending end located at the peripheral portion of the tube wall inwardly on the pipe member side, (5) providing a tapered portion to be in a position at the stepwise part inside the diameter expanding chamber and furtherly engaging the aforementioned tapered portion to the expanded wall at the tube wall side which has said expanded wall previously formed at its distal end, or (6) expanding the diameter partially of the diameter expanding chamber in a direction towards the end portion and connecting the expanding wall portion of the pipe member side that has the expanded wall inwardly been located at its distal end to the stepwise portion of said diameter expanding portion.

As described in the above, the reducing forming of the pipe diameter can be achieved by one of the aforementioned methods all of which aim at forming a structure in such a way that the inner diameter of the pipe wall or the expanded portion after the diameter reducing forming would be produced to have dimension that is smaller than the outer diameter of said expanded wall.

According to the presently invented method for connecting and fixing the pipes, a number of advantages are gained among which is the effect that the sealing materials will be squeezed and tightened to the pipe wall by the diameter reducing forming method. Furthermore, the diameter reducing forming technique will affect the whole area of the tube wall or partially by providing a plurality of circular concave groove, or even to the pipe members. Moreover, by supporting at the projection portions, expanded wall or concave grooves, or stepwise portion of the distal periphery portion of the tube wall, and by engaging at the tapered portion of the expanded wall provided at the pipe member or by diameter reducing the connecting portion with a contacting situation to the stepwise portion of the diameter expanded portion, an important aim is achieved which is the heating soldering means can be completely eliminated; hence the pipe member or piping components on which the protective film was previously coated for anticorrosion purposes can be utilized. Moreover, the routine process done in conventional methods of connections which is the re-coating procedures after the connecting process is not needed so that the operation will become simpler and the producability will be significantly improved.

Furthermore, even under a vibrational movement during the piping procedures which might subject the connected portions to expected failures of cracking or fracture are avoided and hence there should not be any concerns about the deterioration of the mechanical strength of the connected portions, leading to a long-time, secure and stable connections.

Figure 1:
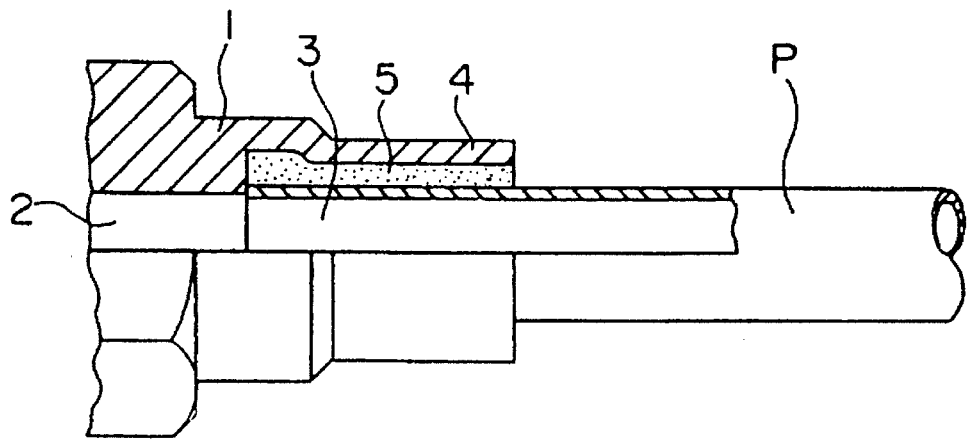
FIG. 1 is a partially cut cross-sectional view of a basic diagram showing a connecting condition of the connecting and fixing method for the metallic pipes of small diameter, according to the present invention.
Figure 2:
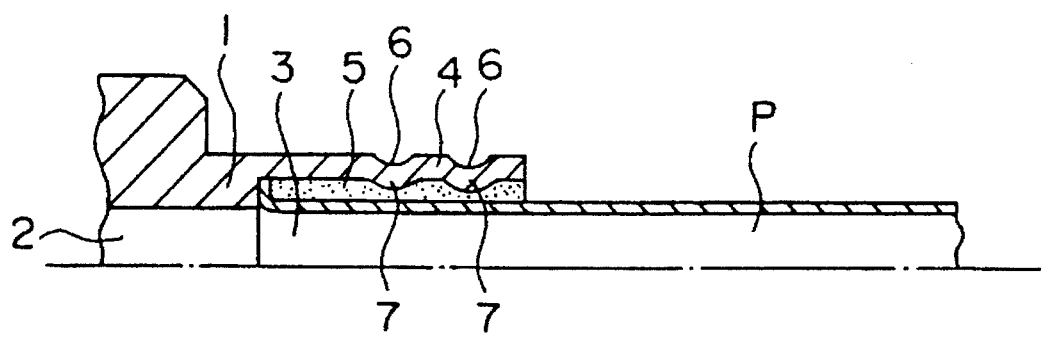
FIG. 2 is a half cut cross-sectional view illustrating another variation of connecting condition according to the connecting anf fixing method of the FIG. 1.

DETAILED DESCRIPTION OF PREFERRED EMBODIMENTS:

As shown in FIGS. 1 and 2, there are a piping component (1) of various connecting fittings or base plate including an eye joint, straight connector or elbow connector. Said piping component (1) is connected to a passage hole (2) which is located inside an axial core and there projects a pipe wall (4) forming a diameter expanding chamber (3) on the connecting side. Circular sealing components (5) are basically composed of elastic materials such as rubbers or resins or soft metallic materials such as copper or aluminum, or lining or cladding of the above mentioned material are inserted to the diameter expanding chamber (3), or covered over the vicinity area of the distal end portion to be connected to connect to the pipe member (P). As seen in FIG. 1, the whole area of the tube wall (4) that has been positioned at the diameter expanding chamber (3) is designed to be squeezed along its longitudinal direction from the outer peripheral side by means of a chuck or a roller to perform a diameter reducing forming in order to connect the pipe member (P) by squeezing and tightening said sealing materials (5).

It should be emphasized that it is not necessary to operate the diameter reducing forming on an entire area; but, as seen in FIG. 2, a designed plurality of circular concave grooves (6) can be formed by the diameter reducing forming to project a portion of the tube wall (4) in an inward direction to form circular projections (7).

Figure 3:
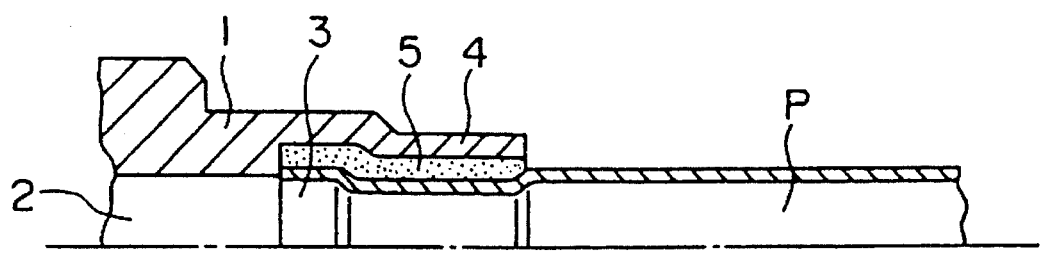
FIG. 3 is a view equivalent to FIG. 2, showing another variation of the connecting and fixing method.
Figure 4:
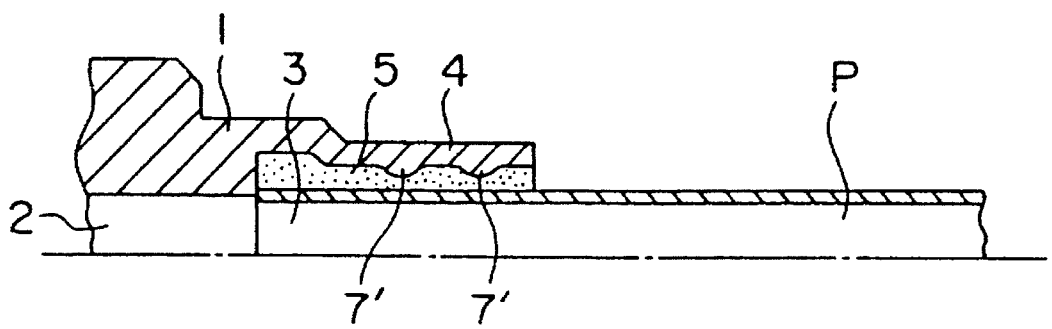
FIG. 4 is a view equivalent to FIG. 2, showing still further variation of the connecting and fixing method.
Figure 5:
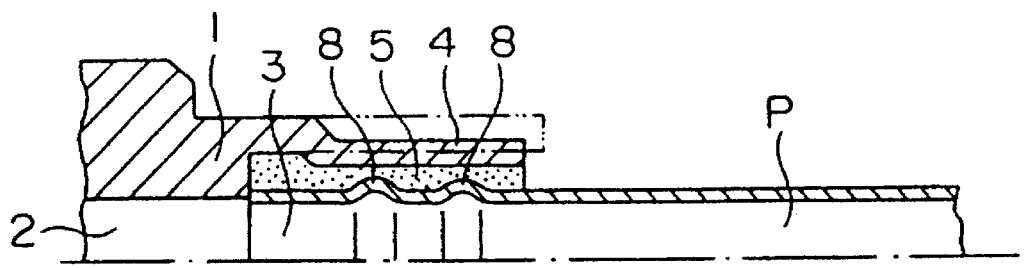
FIG. 5 is a view equivalent to FIG. 2, showing yet another variation of the connecting and fixing method.
Figure 6:
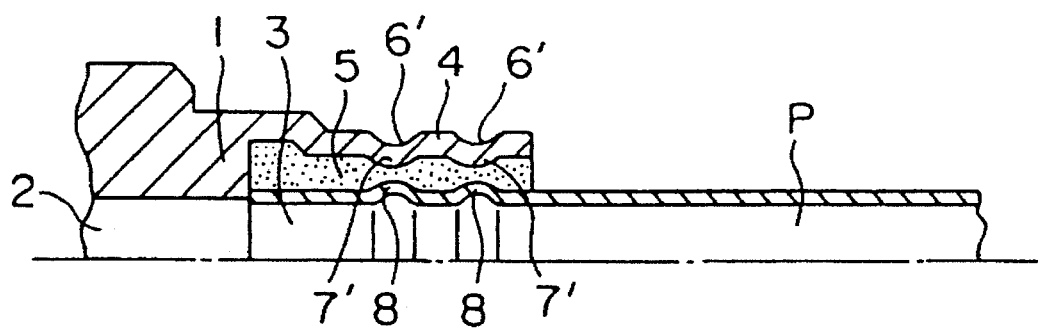
FIG. 6 is a view equivalent to FIG. 2, illustrating yet another variation of the connecting and fixing method.
Figure 7:
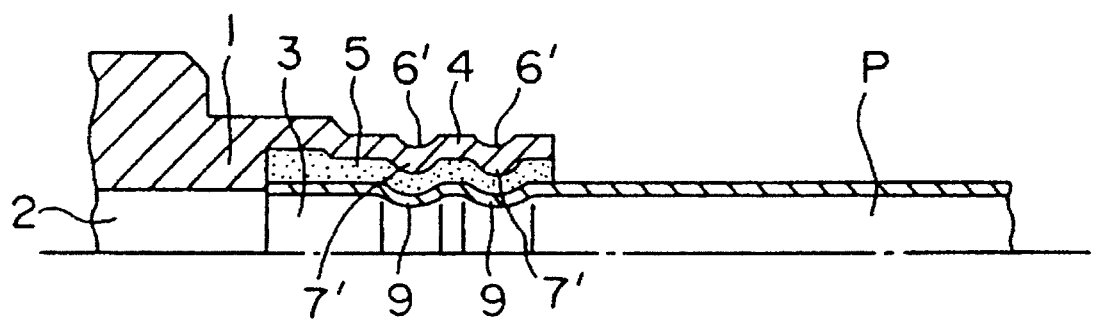
FIG. 7 is a view equivalent ot FIG. 2, showing another variation of the connecting and fixing method.

Describing another embodiment for this invention, circular concave grooves (6')(FIGS. 6 and 7) are being previously formed on the outer peripheral surface of said tube wall (4) and/or circular inwardly formed projections (7') (FIGS. 4,6,7) are being previously provided and located on the on inner peripheral surface of the tube wall (4), followed by the diameter reducing forming the entire area of the tube wall (4) after inserting the pipe member (P). Furthermore, circular concave portion as seen in FIG. 3 or circular expanded wall (8)(FIG. 5) is being previously designed to be provided at the inserting portion for the pipe member (P), and the entire area of the pipe member (P) can be formed to reduce the diameter after inserting the pipe member. As an alternative, a circular expanded wall (8)(FIG. 6) or a circular concave groove (9)(FIG. 7) has been designed to be previously provided, and the diameter reducing forming can be performed on an entire area of the tube wall (4) in which a circular concave groove (6') is previously provided.

Figure 8:
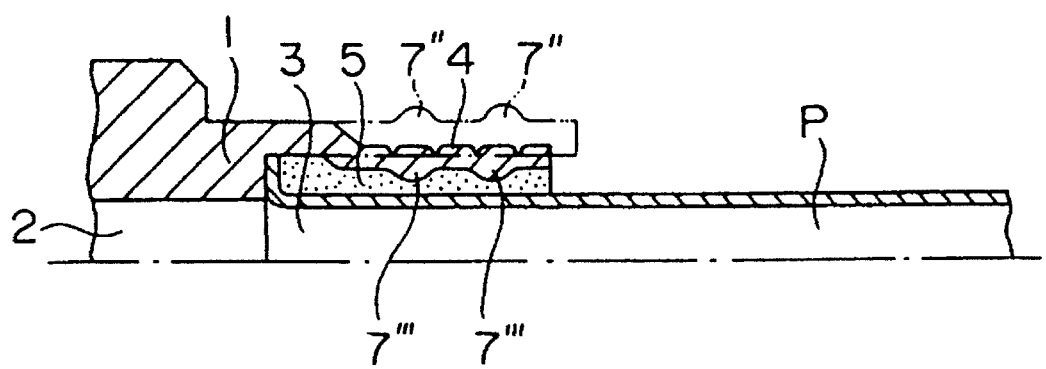
FIG. 8 is a view equivalent to FIG. 2, showing still another variation of the connecting and fixing method.
Figure 9A:
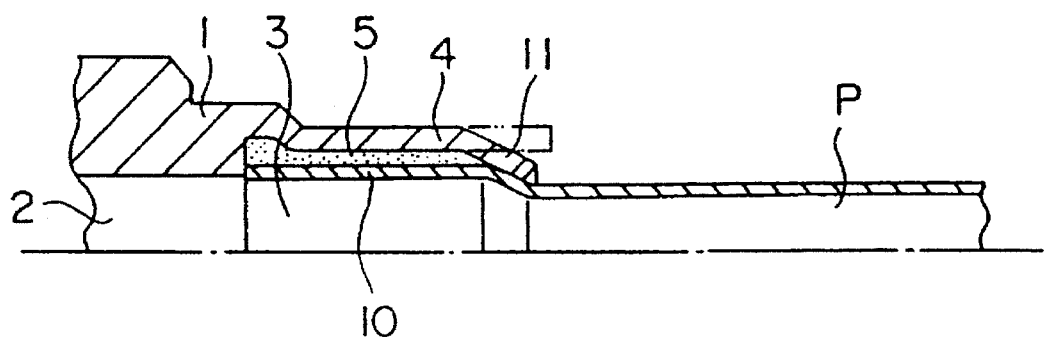
FIG. 9 is a view equivalent to FIG. 2, showing yet further variation of the connecting and fixing method, wherein (a) showing one example, and (b) showing another example.
Figure 9B:
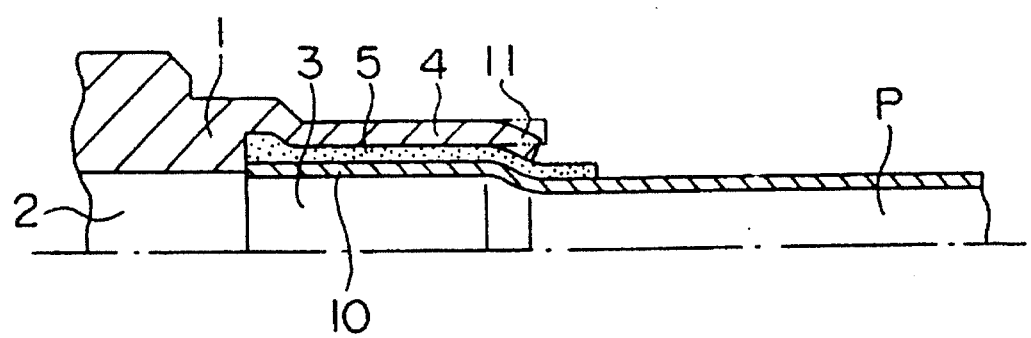

Furthermore, after the circular outwardly projection (7") (FIG. 8) is provided on the outer peripheral surface of the tube wall (4), said circular projection (7") portion after inserting the pipe member (P) is then subjected to a diameter reducing forming, so that an outwardly projection (7") will be deformed plastically leading to the formations of a circular projection (7''') (FIG. 8) on the inner peripheral surface of the tube wall (4), resulting in the effect of tightening the sealing material (5) to connect to the pipe member (7). In FIG. 9, there is an expanded diameter portion (10) having a step which is previously provided on the connecting portion on the pipe member (P). With this construction, by the diameter reducing forming, it will be possible to obtain the desired effect of tightening directly (FIG. 9) to the step portion of the diameter expanded portion (10) by inwardly bending of the distal peripheral portion (11) of the tube wall (4) or indirectly (FIG. 9b) by means of the sealing material. In this case, when the sealing material (5) is used as an inserting material, a fretting can be prevented and any damage of the film coated on the surface can also be avoided.

Figure 10:
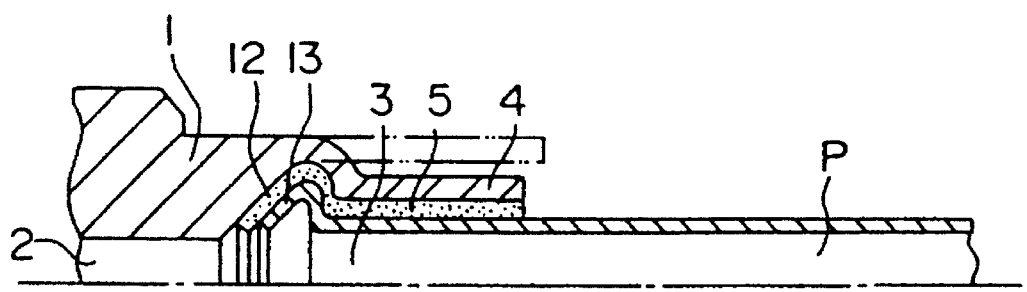
FIG. 10 is a view equivalent ot FIG. 2, showing yet a further variation of the connecting and fixing method.
Figure 11:
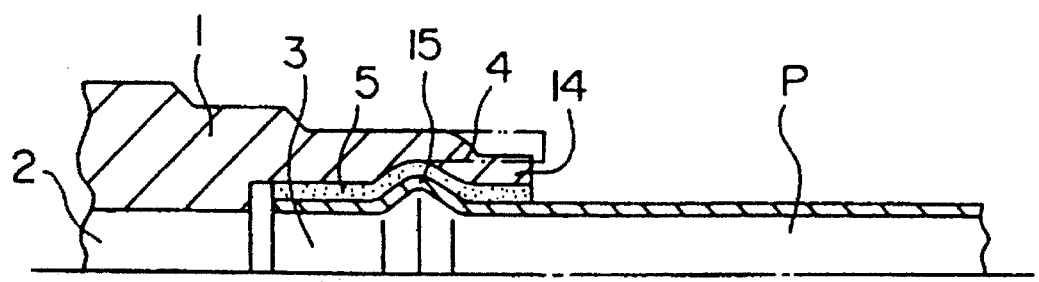
FIG. 11 is a view equivalent to FIG. 2, illustrating another variation of the connecting and fixing method.

In FIG. 10, there is a tapered surface (12) which is provided in a location which is on the inner step portion of the diameter expanding chamber (3). The diameter reducing forming can be applied after an expanded wall (13) portion at the distal end of the pipe member (P) which is furtherly engaged to the tapered surface (12). In FIG. 11, it can be seen that there is an expanded diameter (14) of partially the diameter expanding chamber (3) at its distal end. An expanded wall (15) portion being positioned slightly in an inward location of the distal end of the pipe member (P) which is in contact to a step (14') portion of said expanded diameter portion and the expanded diameter portion (14) is subjected to the desired diameter reducing forming so that the maximum diameter of the reduced part of the expanded portion (14) reaches that dimension which is meant to be of smaller diameter in a squeezed opening shape to perform a secure connection.

It is preferable, in the embodiments that have been illustrated in FIGS. 10 and 11, that the inner diameter of the tube wall (4) and the expanded diameter portion (14) after the diameter reducing forming should be smaller in diameter than the outer diameter of the expanded wall (13)(15) for the aim of improvement of the pulling-out strength.

The relative positioning among said circular concave grooves (6)(6'), projections (7)(7')(7"), the expanded wall (8) and concave groove (9) as well as the relative positioning between the expanded diameter portion (10) with steps and the distal periphery portion (11), the tapered surface (12) and the expanded wall (12) and the expanded diameter (14) and the expanded wall (15) can be carefully chosen so that they will perform satisfactorily the action of the diameter reducing forming.

As described in the above, by the connecting and fixing method for metallic pipes with small diameter according to the present invention, the cylindrical sealing material (5) is inserted to the diameter expanding chamber (3) which forms the tube wall (4) of the piping component (1) and said tube wall portion will be efficiently subjected to the diameter reducing forming and as a result it will squeeze and tighten the pipe member (P). Accordingly, a soldering process that involve heating and is required in the conventional method for connecting pipes can be totally eliminated. Besides, the pipe member (P) or piping components on which the protective film is previously coated can be utilized. At the same time, the re-coating procedure of the protective film done with the conventional ways after the connection and fixation of the pipes is not needed, so that the operational procedure will become simpler and the producability will get enhanced. Moreover, even under the conditions by which there might exist a concern about the reduction of the mechanical strengths of the connected portion due to the action of vibration possibly caused during the piping procedure, the sealing material (5) will act in way to exhibit a vibration-absorbing function so that no cracks nor fractures might take place in the connected portions, leading to expected failure.

Overall, the improved method for connecting and fixing metallic pipes of small diameter according to the present invention represents a long-term and secure connection performance thereof.

While this invention has been described in detail with respect to preferred embodiments and examples, it should be understood that the invention is not limited to that precise embodiments; rather many modifications and variations would present themselves to those of skill in the art without departing from the scope and spirit of this invention, as defined in the appended claims.

What is claimed is:

1. A connecting and fixing method for metallic pipes with small diameter, said method comprising the steps of:

providing a piping component having an axial core with a passage hole extending axially therethrough and having a tube wall projecting from said axial core, said tube wall defining an expanded chamber communicating with said passage hole and defining a diameter greater than said passage hole, said tube wall having an outwardly located projection thereon;

providing a pipe member having a connecting end and having a nominal outside diameter less than the diameter of said expanded chamber of said piping component;

providing a tubular annular sealing component formed from an elastic material and having an inside diameter selected for fitting said sealing component over said pipe member and an outside diameter selected for fitting said sealing component inside said expanded chamber;

forming at least one circumferential discontinuity in said pipe member in proximity to the end thereof such that said circumferential discontinuity defines an outside diameter different from said nominal outside diameter of said pipe member;

inserting said end of said pipe member including the circumferential discontinuity thereof through said sealing component and into said expanded chamber of said tube wall until said end of said pipe member abuts said axial core; and forming at least one diameter reducing area on said tube wall at a location substantially registered with the circumferential discontinuity in the pipe member and at said outwardly located projection to obtain an inwardly formed projection on said tube wall to squeeze and tightly seal said sealing component into connecting engagement with the circumferential discontinuity on the pipe member for holding said end of said pipe member in the expanded chamber of said piping component.

2. The connecting and fixing method for metallic pipes with small diameter of claim 1, wherein the piping component is composed of metallic fittings.

3. A connecting and fixing method for metallic pipes with small diameter, said method comprising the steps of:

providing a piping component having an axial core with a passage hole extending axially therethrough and having a tube wall projecting from said axial core, said tube wall defining an expanded chamber communicating with said passage hole and defining a diameter greater than said passage hole;

providing a pipe member having a connecting end and having a nominal outside diameter less than the diameter of said expanded chamber of said piping component;

providing a tubular annular sealing component formed from an elastic material and having an inside diameter selected for fitting said sealing component over said pipe member and an outside diameter selected for fitting said sealing component inside said expanded chamber;

forming in said pipe member an expanded diameter portion in proximity to the end thereof and forming a step portion intermediate the expanded diameter portion and portions of the pipe member having said nominal outside diameter;

inserting said end of said pipe member including the expanded diameter portion and the step portion thereof through said sealing component and into said expanded chamber of said tube wall until said end of said pipe member abuts said axial core; and forming at least one diameter reducing area on said tube wall by bending the tube wall inwardly at a location substantially registered with the step portion in the pipe member to squeeze and tightly seal said sealing component between said tube wall and said pipe member and to hold said end of said pipe member in the expanded chamber of said piping component.

4. A connecting and fixing method for metallic pipes with small diameter, said method comprising the steps of:

providing a piping component having an axial core with a passage hole extending axially therethrough and having a tube wall projecting from said axial core, said tube wall defining an expanded chamber communicating with said passage hole and defining a diameter greater than said passage hole, a tapered surface extending between the expanded chamber and the passage hole of the axial core;

providing a pipe member having a connecting end and having a nominal outside diameter less than the diameter of said expanded chamber of said piping component;

providing a tubular annular sealing component formed from an elastic material and having an inside diameter selected for fitting said sealing component over said pipe member and an outside diameter selected for fitting said sealing component inside said expanded chamber;

forming at least one circumferential discontinuity in said pipe member in proximity to the end thereof such that said circumferential discontinuity defines an outside diameter greater than said nominal outside diameter of said pipe member and such that the circumferential discontinuity defines a tapered portion at the end of said pipe member, said tapered portion being disposed and configured to engage with the tapered surface of the piping component;

inserting said end of said pipe member including the circumferential discontinuity thereof through said sealing component and into said expanded chamber of said tube wall until said tapered portion of said pipe member abuts said tapered surface extending between said expanded chamber and the passage hole of the axial core; and forming at least one diameter reducing area on said tube wall at a location substantially registered with the circumferential discontinuity in the pipe member to squeeze and tightly seal said sealing component into connecting engagement with the circumferential discontinuity on the pipe member for holding said end of said tapered portion of the pipe member against the tapered surface of said piping component.

5. The connecting and fixing method for metallic pipes with small diameter of claim 4, wherein the step of reducing the diameter of the tube wall portion comprises reducing the diameter to be smaller than the outer diameter of said expanded wall of said pipe member.

6. A connecting and fixing method for metallic pipes with small diameter, said method comprising the steps of:

providing a piping component having an axial core with a passage hole extending axially therethrough and having a tube wall projecting from said axial core, said tube wall defining an expanded chamber communicating with said passage hole and defining a diameter greater than said passage hole;

providing a pipe member having a connecting end and having a nominal outside diameter less than the diameter of said expanded chamber of said piping component;

providing a tubular annular sealing component formed from an elastic material and having and inside diameter selected for fitting said sealing component over said pipe member and an outside diameter selected for fitting said sealing component inside said expanded chamber;

forming an expanded wall in said pipe member in proximity to the end thereof such that said expanded wall defines an outside diameter greater than said nominal outside diameter of said pipe member and smaller than said expanded chamber of said tube wall;

inserting said end of said pipe member including the expanded wall thereof through said sealing component and into said expanded chamber of said tube wall until said end of said pipe member abuts said axial core; and forming a diameter reducing area on said tube wall around the expanded wall of the pipe member to squeeze and tightly seal said sealing component into connecting engagement with the expanded wall of the pipe member for holding said end of said pipe member in the expanded chamber of said piping component.

7. The connecting and fixing method for metallic pipes with small diameter of claim 6, wherein the step of forming the diameter reducing area on the tube wall comprises forming the diameter reducing area to be smaller than the outer diameter of said expanded wall portion of the pipe member.

* * * * *